US012572291B2

(12) United States Patent (10) Patent No.: US 12,572,291 B2
Goodman et al. (45) Date of Patent: Mar. 10, 2026

(54) NEAR MEMORY PROCESSING MODULE FOR DISTRIBUTION OF ALLOCATION UNITS

(71) Applicant: Huawei Cloud Computing Technologies Co., Ltd., Gui'an New District (CN)

(72) Inventors: Daniel Goodman, Hod Hasharon (IL); Amit Golander, Hod Hasharon (IL)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 0 days.

(21) Appl. No.: 18/770,044

(22) Filed: Jul. 11, 2024

(65) Prior Publication Data

US 2024/0361928 A1 Oct. 31, 2024

Related U.S. Application Data

(63) Continuation of application No. PCT/EP2022/050427, filed on Jan. 11, 2022.

(51) Int. Cl.
G06F 3/06 (2006.01)
(52) U.S. Cl.
CPC .......... G06F 3/0631 (2013.01); G06F 3/0604 (2013.01); G06F 3/067 (2013.01)

(58) Field of Classification Search
CPC ....... G06F 3/0631; G06F 3/0604; G06F 3/067
See application file for complete search history.

(56) References Cited

U.S. PATENT DOCUMENTS

| | | | | |
|---|---|---|---|---|
| 10,223,184 B1 * | 3/2019 | McKelvie | ............. | G06F 3/0659 |
| 2019/0007206 A1 * | 1/2019 | Surla | ....................... | H04L 63/10 |

* cited by examiner

*Primary Examiner* — Masud K Khan
(74) *Attorney, Agent, or Firm* — Leydig, Voit & Mayer, Ltd.

(57) ABSTRACT

Provided is a near memory processing (NMP) module for a centralized logging storage array, which includes one or more servers configured to host one or more allocation units assigned to a logical volume, wherein the NMP module is associated with a respective allocation unit. The NMP module is configured to return a state of the respective allocation unit in response to one or more commands received from one or more client devices. The state of the allocation unit includes a mode of the allocation unit. The mode includes one of active, uninitialized, or sealed. When the mode of the allocation unit is uninitialized, the NMP module is configured to change the mode of the respective allocation unit to active in response to receiving an append command from a client device.

20 Claims, 7 Drawing Sheets

CENTRALIZED LOGGING STORAGE ARRAY 204

SERVER 206A

ALLOCATION UNIT 208A

NEAR MEMORY PROCESSING, NMP MODULE 202A

SERVER 206B

ALLOCATION UNIT 208B

NEAR MEMORY PROCESSING, NMP MODULE 202B

SERVER 206N

ALLOCATION UNIT 208N

NEAR MEMORY PROCESSING, NMP MODULE 202N

200

400

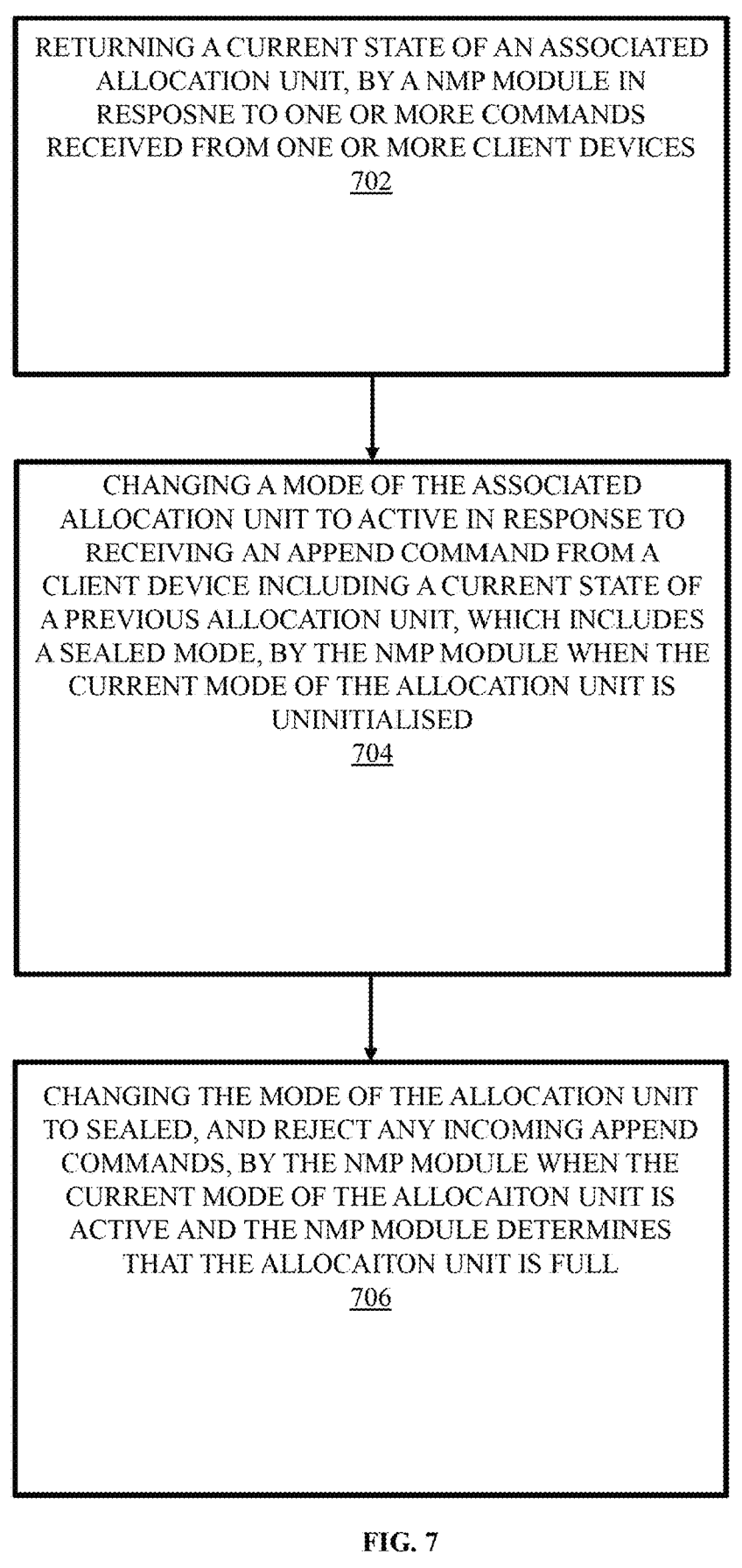

RETURNING A CURRENT STATE OF AN ASSOCIATED ALLOCATION UNIT, BY A NMP MODULE IN RESPOSNE TO ONE OR MORE COMMANDS RECEIVED FROM ONE OR MORE CLIENT DEVICES
702

CHANGING A MODE OF THE ASSOCIATED ALLOCATION UNIT TO ACTIVE IN RESPONSE TO RECEIVING AN APPEND COMMAND FROM A CLIENT DEVICE INCLUDING A CURRENT STATE OF A PREVIOUS ALLOCATION UNIT, WHICH INCLUDES A SEALED MODE, BY THE NMP MODULE WHEN THE CURRENT MODE OF THE ALLOCATION UNIT IS UNINITIALISED
704

CHANGING THE MODE OF THE ALLOCATION UNIT TO SEALED, AND REJECT ANY INCOMING APPEND COMMANDS, BY THE NMP MODULE WHEN THE CURRENT MODE OF THE ALLOCAITON UNIT IS ACTIVE AND THE NMP MODULE DETERMINES THAT THE ALLOCAITON UNIT IS FULL
706

FIG. 7

NEAR MEMORY PROCESSING MODULE FOR DISTRIBUTION OF ALLOCATION UNITS

CROSS-REFERENCE TO RELATED APPLICATIONS

This application is a continuation of International Application No. PCT/EP2022/050427, filed on Jan. 11, 2022, the disclosure of which is hereby incorporated by reference in its entirety.

FIELD

Embodiments of the present disclosure relate to a near memory processing (NMP) module for a centralized logging storage array, and to a client device arranged to communicate with the centralized logging storage array, and also to a method of operating the centralized logging storage array.

BACKGROUND

FIG. 1 illustrates an architecture 100 for continuous multi-writer logging. The architecture 100 includes one or more client devices 102A-N, a RDMA Fabric 104, and a storage array 106. The one or more client devices 102A-N include a first client device 102A, a second client device 102B and a Nth client device 102N, each including an application with commands including pmWAL and pmAddr. The RDMA Fabric 104 allows data transfers with much less overhead and a faster response time from lower latency. The storage array 106 includes one or more datastructures 108A-N, each including a plugin and an allocation unit.

The architecture 100 segments the log into 1 GB allocation units (i.e. logic is split between a client element and the allocation unit plugin). One or more plugins 110A-N are able to write to one or more allocation units 112A-N. The one or more plugins 110A-N include logging applications like database write-ahead-logs (WAL), require that each append to a log return an address of the appended record and that critically all data up to that address is valid and continuous with no holes nor torn data. Success responses from the one or more plugins 110A-N are sequenced with specific addresses. Further, the architecture 100 is based on programmable memory and the RDMA fabric 104, which provides latency performance with a quality of service (QoS) 10× current solutions for specific Input/Output (IO) sizes. Even with maintaining the latency with QoS, usage of these logs requires fail-fast i.e. the append operation may be failed as quickly as possible. And the response latency is critical to application performance, regardless of whether an append succeeds or fails. The architecture 100 may continue to write valid data to the log, even if the client or the application has failed, i.e. optimistic writing of data to the log is allowed as long as the log is valid.

Each allocation unit represents a segment of the log, and a final size of each of the allocation units is dynamic as append payload size is not fixed. The first allocation unit 112A begins at the beginning of the log, and a next allocation unit 112N will logically start from a next byte after the size of the previous allocation unit (i.e, the first allocation unit 112A). Once the first allocation unit 112A is sealed, the final size can be determined, which enables the next allocation unit to begin writing. The size of the allocation units must be recorded in order to enable the next allocation unit to know its logical offset.

Switching to the next allocation unit may arise drawbacks including when and who will allocate the next allocation unit when there is efficient remaining space in the previous allocation unit, and ensuring of all the IOs to the current allocation unit is either completed or failed, before begin writing to the next allocation unit. As the allocation unit represents a logical segment of the log, the next allocation unit cannot begin to service appends until knowing the final size of the previous allocation unit, as this is required for the allocation unit to know its logical offset within the log. And a single client may not reliably be used to send data to the next allocation unit, as the client may never return or a new client may appear at any time.

Therefore, there arises a need to address the aforementioned technical problem/drawbacks in developing a solution that enables filling of allocation units and automatically allocating the next allocation unit with fast and efficient service in a storage array.

SUMMARY

Embodiments of the present disclosure provide a near memory processing (NMP) module for a centralized logging storage array, a client device arranged to communicate with the centralized logging storage array, and a method of operating the centralized logging storage array, that provides distribution of allocation units by filling of allocation units and automatically allocating the next allocation unit with fast and efficient service in a storage array while avoiding one or more disadvantages of prior art approaches.

Embodiments of the present disclosure provide a near memory processing (NMP) module for a centralized logging storage array, a client device arranged to communicate with the centralized logging storage array, and a method of operating the centralized logging storage array.

According to a first aspect, there is provided a near memory processing (NMP) module for a centralized logging storage array which includes one or more servers configured to host one or more allocation units assigned to a logical volume, where the NMP module is associated with the one or more allocation units. The NMP module may be referred to as an "NMP plugin". The NMP module is configured to return a current state of the associated allocation unit in response to one or more commands received from one or more client devices. The state of the allocation unit includes a mode of the allocation unit which is one of a set of modes including ACTIVE, UNINITIALISED, and SEALED. When the current mode of the allocation unit is UNINITIALISED, the NMP module is configured to change the mode of the associated allocation unit to ACTIVE in response to receiving an append command from a client device including a current state of a previous allocation unit, which includes the SEALED mode. When the current mode of the allocation unit is ACTIVE and the NMP module determines that the allocation unit is full, the NMP module is configured to change the mode of the allocation unit to SEALED, and rejects any incoming append commands.

The NMP module next provides one or more commands to a new allocation unit when the previous allocation unit is SEALED, which enables the one or more commands to begin immediately. The architecture provides simplicity as there is no need for any communication between plugins or allocation units as the one or more client devices facilitate the sharing of states between allocation units. The NMP module requires only the state of the allocation unit as ACTIVE and ignores information in future append operations. There will be no need to allocate the next allocation unit until the one or more client devices requires. The NMP module enables filling of the allocation unit automatically to its capacity and allows the next allocation unit to be allocated by a client device without any special code, providing resource management and efficiency.

Optionally, changing the mode of the associated allocation unit from UNINITIALISED to ACTIVE further includes setting a log offset of the associated allocation unit based on a log offset and a last valid byte of the previous allocation unit including the SEALED mode received with the append command from the client device.

Optionally, the NMP module is further configured to determine if a remaining storage capacity of the associated allocation unit is below a first threshold, change the mode of the allocation unit to SEALING and reject any further incoming append commands, and change the mode of the allocation unit to SEALED once any pending append actions have been completed.

Optionally, the NMP module is further configured to determine if a remaining storage capacity of the associated allocation unit is below a second threshold larger than the first threshold, change the mode of the current allocation unit to FULL, and reject any further incoming append commands associated with a payload which is larger than a predetermined payload size threshold.

Optionally, the NMP module is further configured to return the current state of the associated allocation unit in response to a getState command received from the one or more client devices.

According to a second aspect, there is provided a client device arranged to communicate with a centralized logging storage array which includes one or more servers configured to host one or more allocation units assigned to a logical volume. The client device is configured to maintain a state map including a current state of each allocation unit assigned to the logical volume. The state includes a mode of the allocation unit chosen from a set of modes including ACTIVE, UNINITIALISED, and SEALED. The client device is configured to: send at least one append command to a current allocation unit, the append command including the current state of the current allocation unit, and in response to receiving a response to the append command from a near memory processing (NMP) module associated with the current allocation unit, the response indicating that a current mode of the current allocation unit is SEALED, resend the append command with the current state of the current allocation unit including the SEALED mode to a next allocation unit.

The NMP module next provides one or more commands to a new allocation unit when the previous allocation unit is SEALED, which enables the one or more commands to begin immediately. The architecture provides simplicity as there is no need for any communication between plugins or allocation units as the one or more client devices facilitate the sharing of states between allocation units. The NMP module provides robustness by providing append operation for other client devices if the client device fails or disconnects while writing data. The NMP module requires only the state of the allocation unit as ACTIVE and ignores state information in future append operations. There will be no need to allocate the next allocation unit until the client device requires it. The centralized logging storage array automatically fills the allocation unit and allows the next allocation unit to be allocated by a client device without any special code, providing resource management and efficiency.

Optionally, the current state of each allocation unit in the state map further includes a log offset of the allocation unit and a last valid byte of the allocation unit.

Optionally, in response to receiving a response to the append command from the NMP module indicating that the current mode of the current allocation unit is SEALING, the client device is configured to resend the append command with the current state of the current allocation unit including the SEALING mode to the next allocation unit.

Optionally, the client device is further configured to send one or more getState commands to the current SEALING allocation unit.

Optionally, in response to receiving a response to the append command from the NMP module indicating that the current mode of the current allocation unit is SEALING, the client device is configured to determine whether a payload associated with the append command is large or small, based on a predetermined size threshold. For a small payload, the client device is configured to resend the append command with the current state of the current allocation unit including the SEALING mode to the next allocation unit, and for a large payload, the client device is configured to send a GetState command to the current allocation unit.

According to a third aspect, there is provided a method of operating a centralized logging storage array which includes one or more servers configured to host one or more allocation units assigned to a logical volume, and a near memory processing (NMP) module associated with one or more allocation units. The method includes returning, by the NMP module in response to one or more commands received from one or more client devices, a current state of the associated allocation unit. The state of the allocation unit includes a mode of the allocation unit which is one of a set of modes including ACTIVE, UNINITIALISED and SEALED. The method includes changing, by the NMP module when the current mode of the allocation unit is UNINITIALISED, the mode of the associated allocation unit to ACTIVE in response to receiving an append command from a client device including a current state of a previous allocation unit, which includes the SEALED mode. The method includes changing, by the NMP module when the current mode of the allocation unit is ACTIVE and the NMP module determines that the allocation unit is full, the mode of the allocation unit to SEALED, and rejecting any incoming append commands.

The method provides next one or more commands to a new allocation unit when the previous allocation unit is SEALED, which enables the one or more commands to begin immediately. The architecture provides simplicity as there is no need for any communication between plugins or allocation units as the one or more client devices facilitate the sharing of states between allocation units. The method provides robustness by providing append operation for other client devices if a first client device fails or disconnects while writing data. The method requires only the state of the allocation unit as ACTIVE and ignores state information in future append operations. There will be no need to allocate the next allocation unit until the one or more client devices requires. The method enables filling of the allocation unit automatically to its capacity and allows the next allocation unit to be allocated by a client device without any special code, providing resource management and efficiency.

Optionally, changing the mode of the associated allocation unit from UNINITIALISED to ACTIVE further includes setting a log offset of the associated allocation unit based on a log offset and a last valid byte of the previous allocation unit included in the current state of the previous allocation unit including the SEALED mode received with the append command from the client device.

Optionally, the method further includes determining, by the NMP module, if a remaining storage capacity of the associated allocation unit is below a first threshold, changing, by the NMP module, the mode of the allocation unit to SEALING and rejecting any further incoming append commands, and changing, by the NMP module, the mode of the allocation unit to SEALED once any pending append actions have been completed.

Optionally, the method further includes determining, by the NMP module, if a remaining storage capacity of the associated allocation unit is below a second threshold larger than the first threshold, changing, by the NMP module, the mode of the current allocation unit to FULL, and rejecting, by the NMP module, any further incoming append commands associated with a payload which is larger than a predetermined payload size threshold.

Optionally, the method further includes returning, by the NMP module, the current state of the associated allocation unit in response to a getState command received from the one or more client devices.

Optionally, the method further includes maintaining, by a client device arranged to communicate with the centralized logging storage array, a state map including a current state of each allocation unit assigned to the logical volume. The state includes a mode of the allocation unit chosen from a set of modes including ACTIVE, UNINITIALISED and SEALED, The method includes sending, by the client device, at least one append command to a current allocation unit, the append command including the current state of the current allocation unit, and resending, by the client device in response to receiving the response to the append command from the NMP module associated with the current allocation unit indicating that a current mode of the current allocation unit is SEALED, the append command with the current state of the current allocation unit including the SEALED mode to a next allocation unit.

Optionally, the current state of each allocation unit in the state map further includes a log offset of the allocation unit and a last valid byte of the allocation unit.

Optionally, the method further includes resending, by the client device in response to receiving a response to the append command from the NMP module indicating that the current mode of the current allocation unit is SEALING, the append command with the current state of the current allocation unit including the SEALING mode to the next allocation unit.

Optionally, the method further includes sending, by the client device, one or more getState commands to the current SEALING allocation unit.

Optionally, the method further includes determining, by the client device in response to receiving a response to the append command from the NMP module indicating that the current mode of the current allocation unit is SEALING, whether a payload associated with the append command is large or small, based on a predetermined size threshold, and resending, by the client device for a small payload, the append command with the current state of the current allocation unit including the SEALING mode to the next allocation unit, or sending, by the client device for a large payload, a GetState command to the current allocation unit.

Therefore, in contradistinction to the existing solutions, the NMP module next provides commands to a new allocation unit when the previous allocation unit is SEALED, which enables the one or more commands to begin immediately. The architecture provides simplicity as there is no need for any communication between plugins or allocation units as the one or more client devices facilitate the sharing of states between allocation units. The NMP module provides robustness by providing append operation for other client devices if a first client device fails or disconnects while writing data. The NMP module enables filling of the allocation unit automatically to its capacity and allows the next allocation unit to be allocated by a client device without any special code, providing resource management and efficiency. These and other aspects of the disclosure will be apparent from and the implementation(s) described below.

BRIEF DESCRIPTION OF DRAWINGS

Implementations of the disclosure will now be described, by way of example only, with reference to the accompanying drawings, in which:

FIG. 7 is a flow diagram that illustrates a method of operating a centralized logging storage array according to some embodiments.

DETAILED DESCRIPTION

Embodiments of the present disclosure provide a near memory processing (NMP) module for a centralized logging storage array, a client device arranged to communicate with the centralized logging storage array, and a method of operating the centralized logging storage array.

Terms such as "a first", "a second", "a third", and "a fourth" (if any) in the summary, claims, and foregoing accompanying drawings of the disclosure are used to distinguish between similar objects and are not necessarily used to describe a specific sequence or order. It should be understood that the terms so used are interchangeable under appropriate circumstances, so that the implementations of the disclosure described herein are, for example, capable of being implemented in sequences other than the sequences illustrated or described herein. Furthermore, the terms "include" and "have" and any variations thereof, are intended to cover a non-exclusive inclusion. For example, a process, a method, a system, a product, or a device that includes a series of steps or units, is not necessarily limited to expressly listed steps or units but may include other steps or units that are not expressly listed or that are inherent to such process, method, product, or device.

Figure 1:
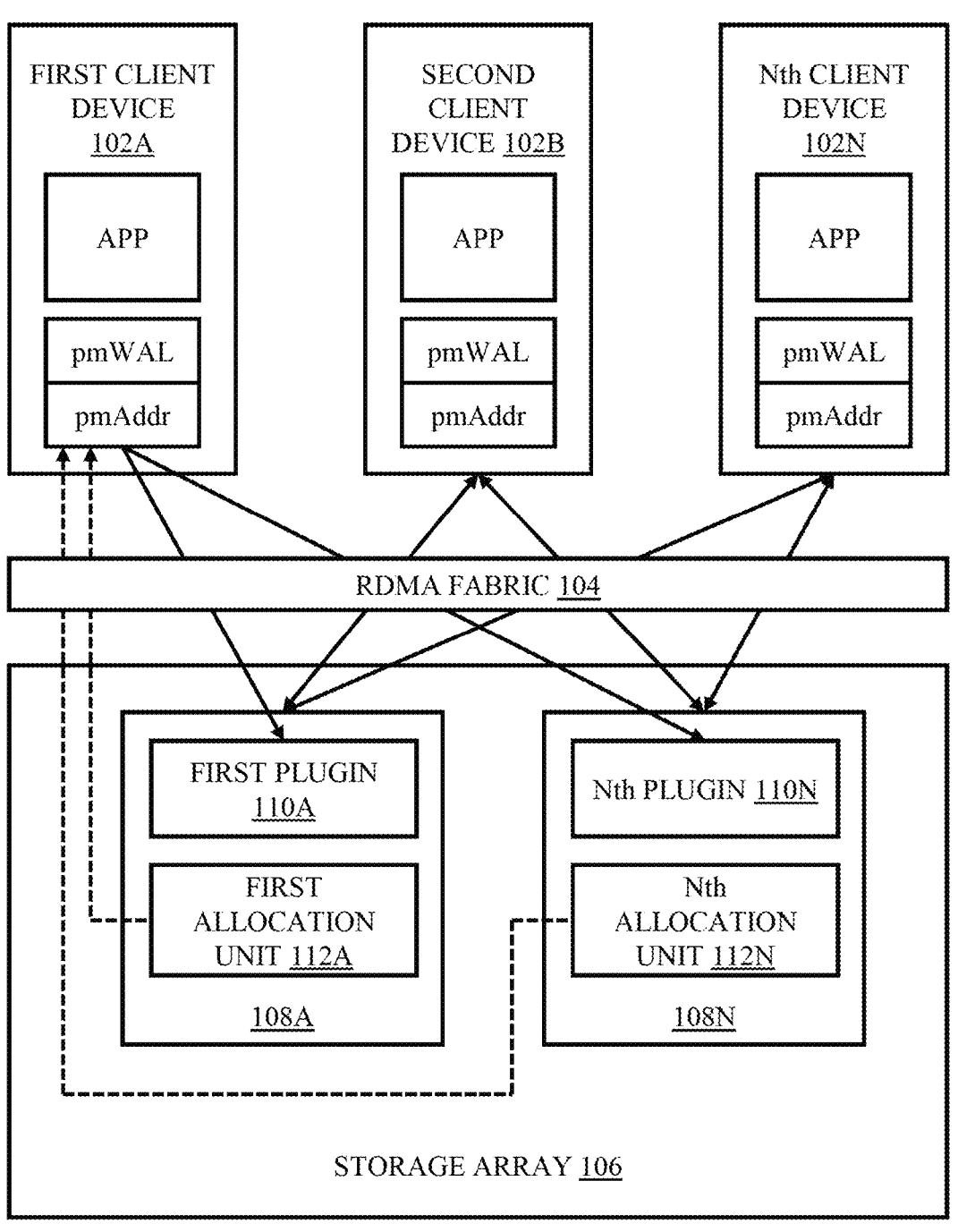
FIG. 1 illustrates an architecture for continuous multi-writer logging.
Figure 2:
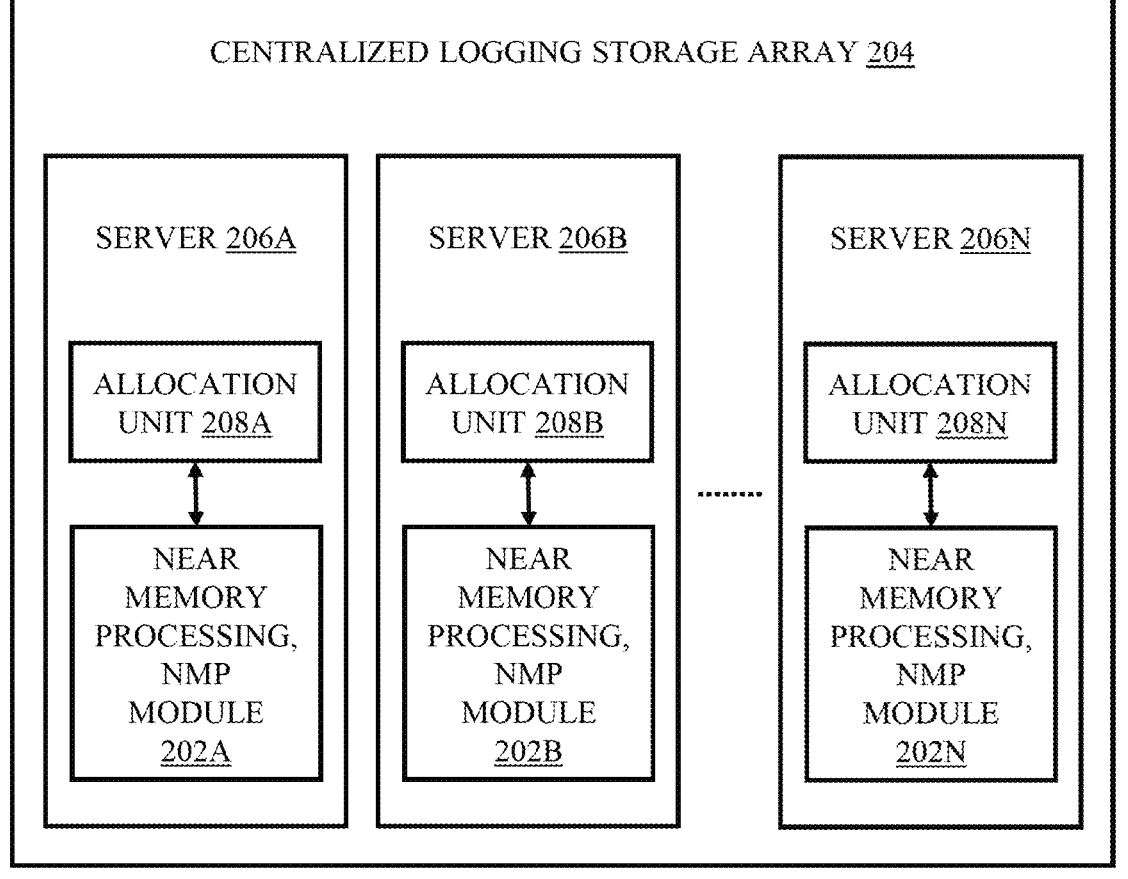
FIG. 2 is a block diagram of a near memory processing (NMP) module for a centralized logging storage array according to some embodiments.

FIG. 2 is a block diagram 200 of a near memory processing (NMP) module 202A-N for a centralized logging storage array 204 in accordance with an implementation of the disclosure. The centralized logging storage array 204 includes one or more servers 206A-N configured to host one or more allocation units 208A-N assigned to a logical volume, where each NMP module 202A-N is associated with the one or more allocation units 208A-N. The NMP module 202A-N is configured to return a current state of the associated allocation unit in response to one or more commands received from one or more client devices. The state of the allocation unit includes a mode of the allocation unit which is one of a set of modes including ACTIVE, UNINITIALISED and SEALED. When the current mode of the allocation unit is UNINITIALISED, the NMP module 202A-N is configured to change the mode of the associated allocation unit to ACTIVE in response to receiving an append command from a client device including a current state of a previous allocation unit, which includes the SEALED mode. When the current mode of the allocation unit is ACTIVE and the NMP module 202A-N determines that the allocation unit is full. The NMP module 202A-N is configured to change the mode of the allocation unit to SEALED, and reject any incoming append commands.

The NMP module 202A-N next provides one or more commands to a new allocation unit when the previous allocation unit is SEALED, which enables the one or more commands to begin immediately. The architecture provides simplicity as there is no need for any communication between plugins or allocation units as the one or more client devices facilitate the sharing of states between allocation units. The NMP module 202A-N provides robustness by providing append operation for other client devices if a first client device fails or disconnects while writing data. The NMP module 202A-N requires only the state of the allocation unit as ACTIVE and ignores information in future append operations. There will be no need to allocate the next allocation unit until the one or more client devices requires. The NMP module 202A-N enables filling of the allocation unit automatically to its capacity and allows the next allocation unit to be allocated by a client device without any special code, providing resource management and efficiency.

The centralized logging storage array 204 may include one or more storage arrays. The one or more storage arrays may include one or more drives that store a huge amount of data, managed by the centralized logging storage array 204. The one or more servers 206A-N may include a cloud server or a virtual server, that enables hosting the one or more allocation units 208A-N assigned to the logical volume. The one or more servers 206A-N may be a dedicated server hosting the one or more allocation units 208A-N. The one or more allocation units 208A-N allocate space for files and directories in the logical volume.

The one or more client devices associated with one or more clients may transmit the one or more commands to the centralized logging storage array 204. The one or more client devices may include any of a mobile phone, a computer, a laptop, a personal digital assistant, and the like. The one or more commands may be an append. Optionally, the one or more commands include any of append (payload, null), or append (payload, au_state$_n$).

The NMP module 202A-N associated with the one or more allocation units 208A-N, is configured to return at least one of the ACTIVE, UNINITIALISED, FULL, SEALING and SEALED state of the one or more allocation units 208A-N in response to the one or more commands. Optionally, the response from the NMP module 202A-N includes a result of the one or more commands, info, offset, or the mode or the state of the allocation unit. The info of the state of the allocation unit may include log_offset, last_valid_byte, and the like. The one or more commands from the one or more client devices include the state of the one or more allocation units 208A-N.

Optionally, changing the mode of the associated allocation unit from UNINITIALISED to ACTIVE further includes setting a log offset of the associated allocation unit based on a log offset and a last valid byte of the previous allocation unit including the SEALED mode received with the append command from the client device. When the mode of an allocation unit 208B is UNINITIALISED, the NMP module 202A-N is configured to change the mode of the allocation unit 208B to ACTIVE and receives data, if the one or more commands from the one or more client devices include the state of the previous allocation unit (i.e. an allocation unit 208A). The NMP module 202A-N change the mode of the allocation unit 208B to ACTIVE only if the mode of the allocation unit 208A is SEALED.

Optionally, the NMP module 202A-N is further configured to determine if a remaining storage capacity of the associated allocation unit is below a first threshold, change the mode of the allocation unit to SEALING and reject any further incoming append commands, and change the mode of the allocation unit to SEALED once any pending append actions have been completed.

Optionally, the NMP module 202A-N is further configured to determine if a remaining storage capacity of the associated allocation unit is below a second threshold larger than the first threshold, change the mode of the current allocation unit to FULL, and reject any further incoming append commands associated with a payload which is larger than a predetermined payload size threshold. When the mode of the allocation unit 208A is ACTIVE, the NMP module 202A-N is configured to determine that the allocation unit 208A is FULL based on a remaining storage capacity in the allocation unit 208A.

Optionally, the NMP module 202A-N is further configured to return the current state of the associated allocation unit in response to a getState command received from the one or more client devices.

Figure 3:
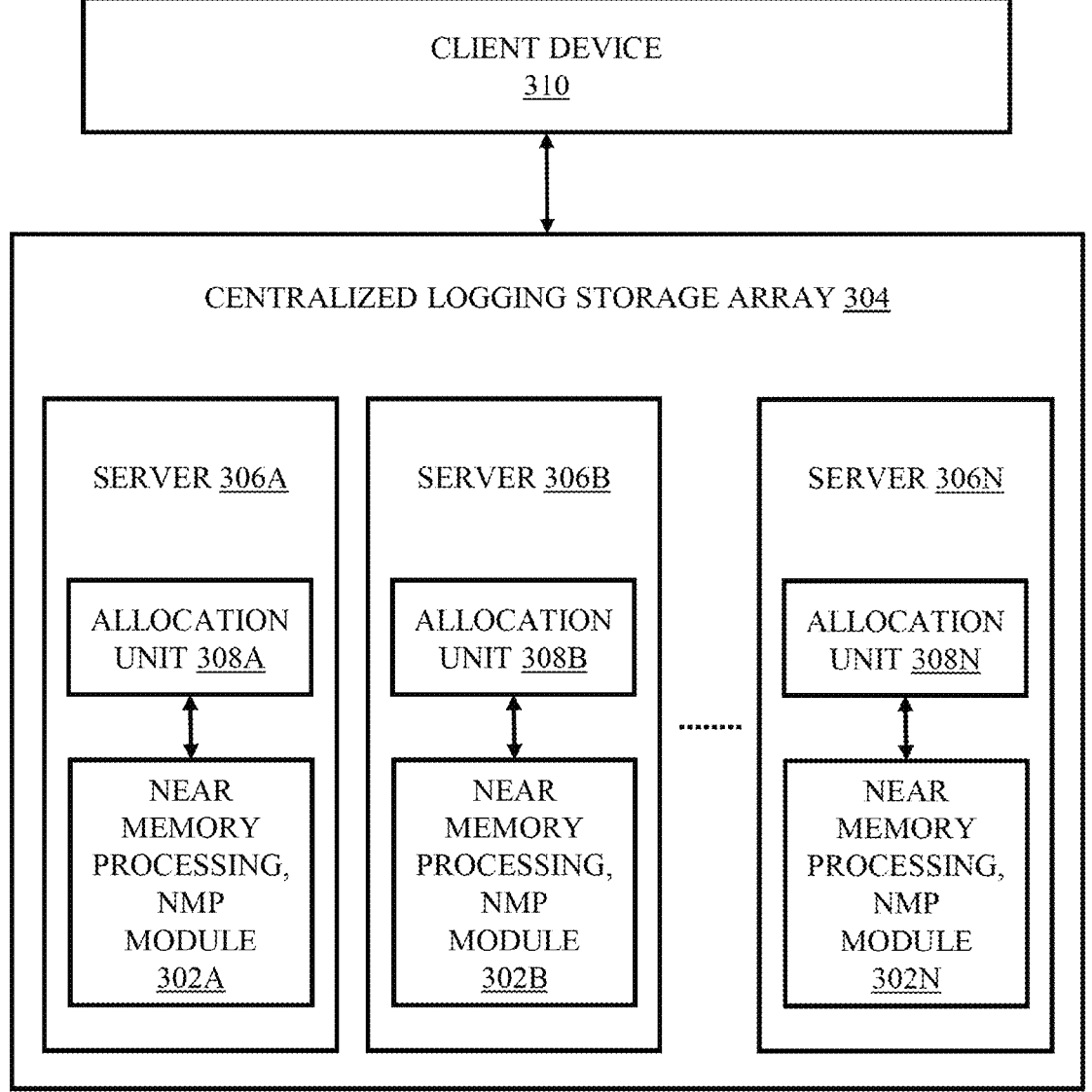
FIG. 3 is a block diagram of a client device communicating with a centralized logging storage array according to some embodiments.

FIG. 3 is a block diagram 300 of a client device 310 communicating with a centralized logging storage array 304 in accordance with an implementation of the disclosure. The client device 310 is arranged to communicate with the centralized logging storage array 304 which includes one or more servers 306A-N configured to host one or more allocation units 308A-N assigned to a logical volume. The client device 310 is configured to maintain a state map including a current state of each allocation unit assigned to the logical volume. The state includes a mode of the allocation unit chosen from a set of modes including ACTIVE, UNINITIALISED, and SEALED. The client device 310 is configured to: send at least one append command to a current allocation unit, the append command including the current state of the current allocation unit, and in response to receiving a response to the append command from a near memory processing (NMP) module 302A-N associated with the current allocation unit, the response indicating that a current mode of the current allocation unit is SEALED, resend the append command with the current state of the current allocation unit including the SEALED mode to a next allocation unit.

The NMP module 302A-N next provides one or more commands to a new allocation unit when the previous allocation unit is SEALED, which enables the one or more commands to begin immediately. The architecture provides simplicity as there is no need for any communication between plugins or allocation units as the one or more client devices facilitate the sharing of states between allocation units. The NMP module 302A-N provides robustness by providing append operation for other client devices if the client device 310 fails or disconnects while writing data. The NMP module 302A-N requires only the state of the allocation unit as ACTIVE and ignores information in future append operations. There will be no need to allocate the next allocation unit until the client device 310 requires. The NMP module 302A-N enables filling of the allocation unit automatically to its capacity and allows the next allocation unit to be allocated by a client device without any special code, providing resource management and efficiency.

The client device 310 is configured to send at least one append command to the centralized logging storage array 304. The at least one append command may include append (payload, null), or append (payload, au_state$_n$). The client device 310 is associated with a client, enables to forward information needed by the one or more allocation units 308A-N. The NMP module 302A-N is configured to determine a storage capacity of an allocation unit 308A, and reject the append command from the client device 310 when the allocation unit 308A is full. A size of the allocation unit 308A may be 1 GB (i.e. 1000 MB). Optionally, allocation unit may be considered full based on a high watermark of, e.g., 995.8 MB. The high watermark on the allocation unit 308A may be based on a difference between the size of the allocation unit 308A and a payload max size. The payload max size may be 2 MB.

The client device 310 may send the append command to a next NMP module 302B associated with a next allocation unit 308B. The centralized logging storage array 304 rejects the append command as the append command does not include a state of the allocation unit 308A. The state of the allocation unit 308A may be returned in response to sending the append command to the allocation unit 308A. Optionally, the state of the allocation unit 308A is obtained with a command getState. The command getState enables the client device 310 to get an update of the one or more allocation units 308A-N. Optionally, the NMP module 302A-N includes a dedicated channel (QP) to ensure the update of the one or more allocation units 308A-N without blocking by a larger back queue. The NMP module 302A-N is configured to change a mode of the allocation unit 308A when all append for the allocation unit 308A are completed. The mode of the allocation unit 308A may be changed to SEALED.

Optionally, the current state of each allocation unit in the state map further includes a log offset of the allocation unit and a last valid byte of the allocation unit.

Optionally, in response to receiving a response to the append command from the NMP module indicating that the current mode of the current allocation unit is SEALING, the client device 310 is configured to resend the append command with the current state of the current allocation unit including the SEALING mode to the next allocation unit.

Optionally, the client device 310 is further configured to send one or more getState commands to the current SEALING allocation unit.

Optionally, in response to receiving a response to the append command from the NMP module 302A-N indicating that the current mode of the current allocation unit is SEALING, the client device 310 is configured to determine whether a payload associated with the append command is large or small, based on a predetermined size threshold. For a small payload, the client device 310 is configured to resend the append command with the current state of the current allocation unit including the SEALING mode to the next allocation unit, and for a large payload, the client device 310 is configured to send a GetState command to the current allocation unit.

Figure 4:
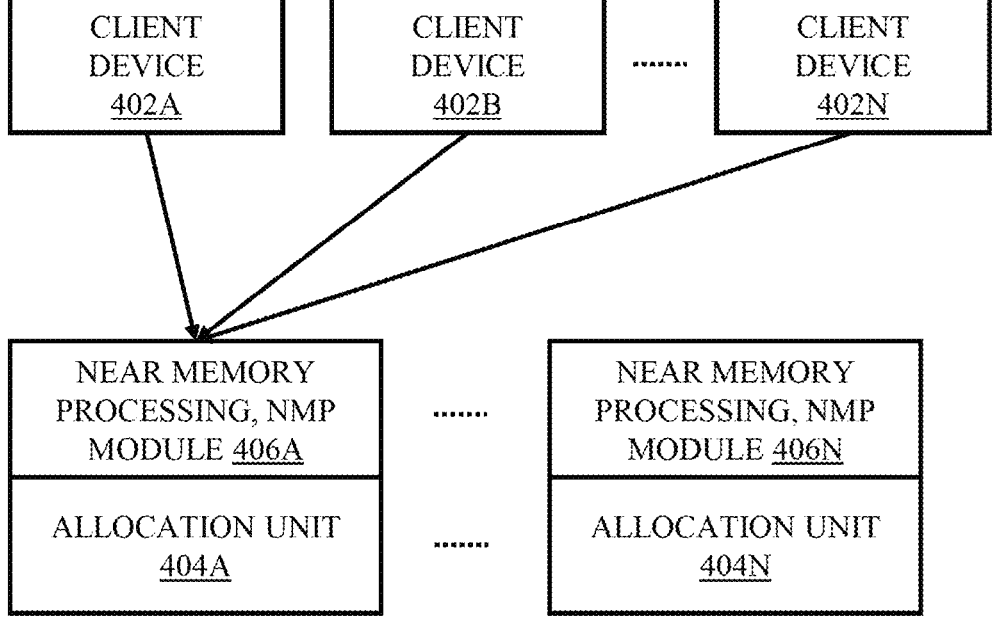
FIG. 4 is a schematic diagram of one or more client devices transmitting one or more commands to one or more allocation units according to some embodiments.

FIG. 4 is a schematic diagram 400 of one or more client devices 402A-N transmitting one or more commands to one or more allocation units 404A-N in accordance with an implementation of the disclosure. The schematic diagram 400 includes the one or more client devices 402A-N, and the one or more allocation unit 404A-N. The one or more client devices 402A-N are configured to send the one or more commands to the one or more allocation units 404A-N. The schematic diagram 400 includes one or more near memory processing (NMP) modules 406A-N that enable the one or more allocation units 404A-N to write. The one or more NMP modules may be a plugin. The one or more commands may be received on the one or more NMP modules 406A-N. A NMP module 406A is configured to receive the one or more commands from the one or more client devices 402A-N, and process the commands to write in an allocation unit 404A. If a mode of the allocation unit 404A is full based on a storage capacity, the NMP module 406A is configured to change the mode of the allocation unit to SEALED.

The mode of the one or more allocation units 404A-N includes UNINITIALIZED, ACTIVE, FULL, SEALING, and SEALED. The one or more client devices 402A-N may obtain an update of the mode of the one or more allocation units 404A-N with a getState command. The one or more allocation units 404A-N may allow the one or more commands from the one or more client devices 402A-N if the mode of the one or more allocation units 404A-N includes ACTIVE, and FULL if the payload is less than, e.g., 16 KB. Optionally, the FULL mode of the one or more allocation units 404A-N includes a low watermark.

$$\text{Low watermark} = AU.\text{usable\_size} - 2.5 \times \text{payload.max\_size}.$$

Optionally, the SEALING mode of the one or more allocation units 404A-N includes a high watermark.

$$\text{High watermark} = AU.\text{size} - 1.1 \times \text{payload.max\_size}.$$

Figure 5:
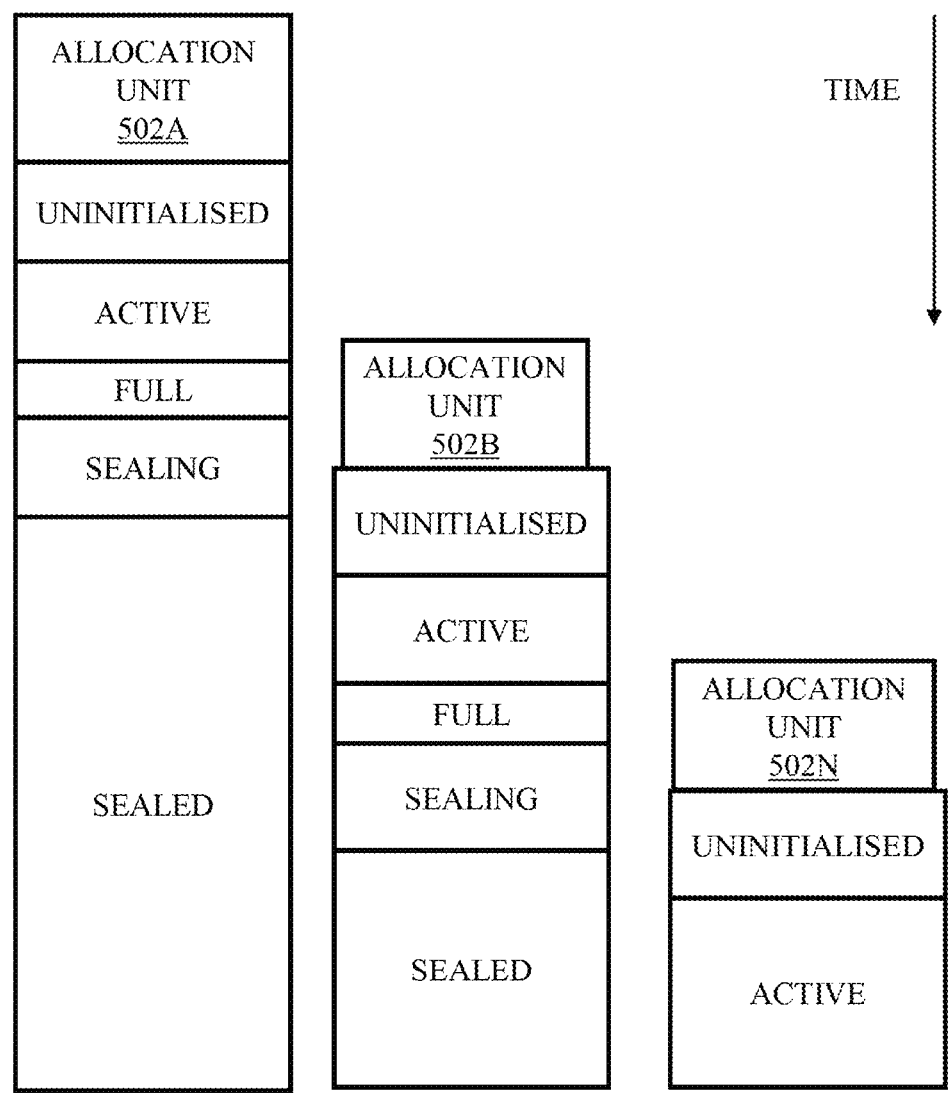
FIG. 5 is a graphical representation of a life cycle and creation of one or more allocation units according to some embodiments.

FIG. 5 is a graphical representation 500 of a life cycle and creation of one or more allocation units 502A-N in accordance with an implementation of the disclosure. The graphical representation 500 includes the one or more allocation units 502A-N with a state and a mode of the one or more allocation units 502A-N, which is changed when one or more commands are received from a client device. The mode of the one or more allocation units 502A-N includes UNINITIALISED. ACTIVE. FULL. SEALING, and SEALED. The one or more allocation units 502A-N include a first allocation unit 502A, a second allocation unit 502B, and a third allocation unit 502N. The first allocation unit 502A is with the mode of UNINITIALISED. When the client device sends the one or more commands, the mode of the first allocation unit 502A is changed to ACTIVE, which enables writing in the allocation unit 502A. When the first allocation unit 502A is full based on a storage capacity, the client device transmits the one or more commands to the second allocation unit 502B. The mode of the first allocation unit 502A may be changed to SEALING and then SEALED, and sends the state and mode of the first allocation unit 502A to the second allocation unit 502B.

The mode of the second allocation unit 502B becomes ACTIVE when the second allocation unit 502B receives the state and mode of the first allocation unit 502A as SEALED. The client device may send the one or more commands to the second allocation unit 502B to write in the allocation unit 502B. When the second allocation unit 502B is full, and the state and mode of the second allocation unit 502B is changed to SEALING and then SEALED, and sends the state and mode of the second allocation unit 502B to the third allocation unit 502C.

Figure 6:
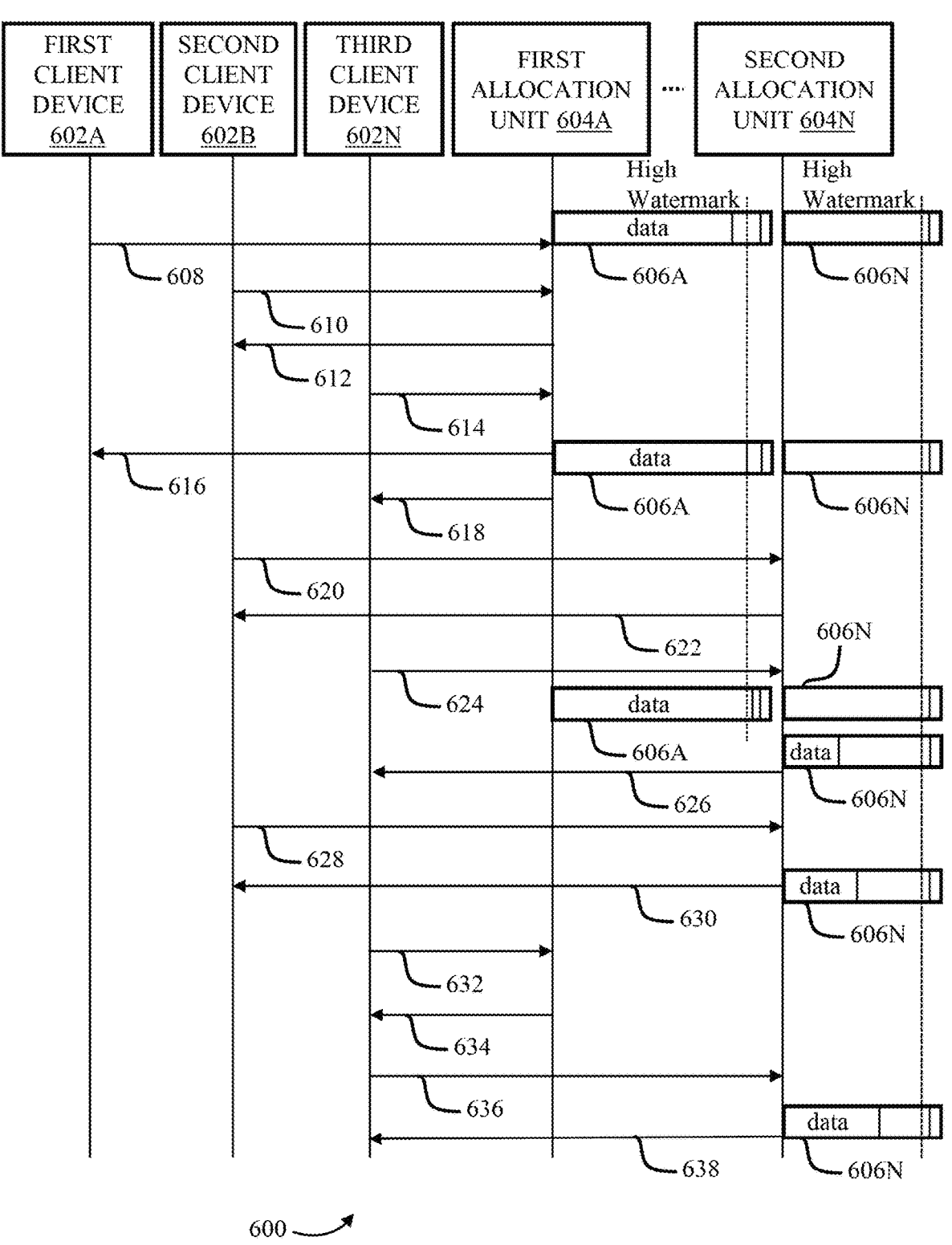
FIG. 6 is a sequence diagram that illustrates one or more client devices communicates with one or more allocation units according to some embodiments.

FIG. 6 is a sequence diagram 600) that illustrates one or more client devices 602A-N communicates with one or more allocation units 604A-N in accordance with an implementation of the disclosure. The interaction diagram 600 includes the one or more client devices 602A-N that include a first client device 602A, a second client device 602B and a third client device 602N, the one or more allocation units 604A-N that include a first allocation unit 604A, and a second allocation unit 604N, and one or more data 606A-N that include a first data 606A and a second data 606N. The one or more client devices 602A-N may send one or more commands to the one or more allocation units 604A-N. Optionally, the one or more commands include append (payload,null).

At a step 608, the first client device 602A sends command append (payload,null) to the first allocation unit 604A, that enables the first allocation unit 604A to write on the first data 606A until reaching high watermark. At a step 610, the second client device 602B sends the command append (payload.null) to the first allocation unit 604A. As the command from the first client device 602A is in process, the first allocation unit 604A sends a response as SEALING with offset and info, at a step 612. At a step 614, the third client device 602N sends the command append (payload, null) to the first allocation unit 604A. At a step 616, the first allocation unit 604A sends a response as SUCCESS to the first client device 602A after data is written, and that enables the first data 606A to a state of SEALED. At a step 618, the first allocation unit 604A sends a response as SEALED to the third client device 602N.

At a step 620, the second client device 602B sends the command append (payload,state=SEALING) to the second allocation unit 606N. At a step 622, the second allocation unit 606N sends a response as UNINITIALISED with offset and info to the second client device 602B, as the info belongs to SEALING. At a step 624, the third client device 602N sends the command append (payload,state=SEALED) to the second allocation unit 606N, which makes the second data 606N ACTIVE to write data. At a step 626, the second allocation unit 604N sends a response as SUCCESS with offset and info to the third client device 602N. At a step 628, the second client device 602B sends the command append (payload,state=SEALING) to the second allocation unit 604N, which enables writing data in the second data 606N, as the second data 606N is ACTIVE and thus ignores the fact that the state was SEALING. At a step 630, the second allocation unit 604N sends a response as SUCCESS with offset and into the second client device 602B.

At a step 632, a third client device 602N sends the command append (payload,null) to the first allocation unit 604A. At a step 634, the first allocation unit 604A sends a response as SEALED with offset and info to the third client device 602N. At a step 636, the third client device 602N sends the command append (payload, state) to the second allocation unit 604N, that enables the second allocation unit 604N to write data in the second data 606N. At a step 638, the second allocation unit 604N sends a response as SUCCESS with offset and info to the third client device 602N.

FIG. 7 is a flow diagram that illustrates a method of operating a centralized logging storage array in accordance with an implementation of the disclosure. The centralized logging storage array includes one or more servers configured to host one or more allocation units assigned to a logical volume, and a near memory processing (NMP) module associated with each of the one or more allocation units. At a step 702, a current state of the associated allocation unit is returned by the NMP module in response to one or more commands received from one or more client devices. The state of the allocation unit includes a mode of the allocation unit which is one of a set of modes including: ACTIVE, UNINITIALISED and SEALED. At a step 704, the mode of the associated allocation unit is changed to ACTIVE in response to receiving an append command from a client device including a current state of a previous allocation unit, which includes the SEALED mode, by the NMP module when the current mode of the allocation unit is UNINITIALISED. At a step 706, the mode of the allocation unit is changed to SEALED, and reject any incoming append commands, by the NMP module when the current mode of the allocation unit is ACTIVE and the NMP module determines that the allocation unit is full.

The method provides next one or more commands to a new allocation unit when the previous allocation unit is SEALED, which enables the one or more commands to begin immediately. The method provides simplicity as there is no need for any communication between plugins or allocation units as the one or more client devices facilitate the sharing of states between allocation units. The method provides robustness by providing append operation for other client devices if a first client device fails or disconnects while writing data. The method requires only the state of the allocation unit as ACTIVE and ignores information in future append operations. There will be no need to allocate the next allocation unit until the one or more client devices requires. The method enables filling of the allocation unit automatically to its capacity and allows the next allocation unit to be allocated by a client device without any special code, providing resource management and efficiency.

Optionally, changing the mode of the associated allocation unit from UNINITIALISED to ACTIVE further includes setting a log offset of the associated allocation unit based on a log offset and a last valid byte of the previous allocation unit included in the current state of the previous allocation unit including the SEALED mode received with the append command from the client device.

Optionally, the method further includes determining, by the NMP module, if a remaining storage capacity of the associated allocation unit is below a first threshold, changing, by the NMP module, the mode of the allocation unit to SEALING and rejecting any further incoming append commands, and changing, by the NMP module, the mode of the allocation unit to SEALED once any pending append actions have been completed.

Optionally, the method further includes determining, by the NMP module, if a remaining storage capacity of the associated allocation unit is below a second threshold larger than the first threshold, changing, by the NMP module, the mode of the current allocation unit to FULL, and rejecting, by the NMP module, any further incoming append commands associated with a payload which is larger than a predetermined payload size threshold.

Optionally, the method further includes returning, by the NMP module, the current state of the associated allocation unit in response to a getState command received from the one or more client devices.

Optionally, the method further includes maintaining, by a client device arranged to communicate with the centralized logging storage array, a state map including a current state of each allocation unit assigned to the logical volume. The state includes a mode of the allocation unit chosen from a set of modes including: ACTIVE, UNINITIALISED and SEALED. The method includes sending, by the client device, at least one append command to a current allocation unit, the append command including the current state of the current allocation unit, and resending, by the client device in response to receiving the response to the append command from the NMP module associated with the current allocation unit indicating that a current mode of the current allocation unit is SEALED, the append command with the current state of the current allocation unit including the SEALED mode to a next allocation unit.

Optionally, the current state of each allocation unit in the state map further includes a log offset of the allocation unit and a last valid byte of the allocation unit.

Optionally, the method further includes resending, by the client device in response to receiving a response to the append command from the NMP module indicating that the current mode of the current allocation unit is SEALING, the append command with the current state of the current allocation unit including the SEALING mode to the next allocation unit.

Optionally, the method further includes sending, by the client device, one or more getState commands to the current SEALING allocation unit.

Optionally, the method further includes determining, by the client device in response to receiving a response to the append command from the NMP module indicating that the current mode of the current allocation unit is SEALING, whether a payload associated with the append command is large or small, based on a predetermined size threshold, and resending, by the client device for a small payload, the append command with the current state of the current allocation unit including the SEALING mode to the next allocation unit, or sending, by the client device for a large payload, a GetState command to the current allocation unit.

Although the disclosure and its advantages have been described in detail, it should be understood that various changes, substitutions, and alterations can be made herein without departing from the spirit and scope of the disclosure as defined by the appended claims.

What is claimed is:

1. A near memory processing (NMP) module for a centralized logging storage array that includes a plurality of servers configured to host a plurality of allocation units assigned to a logical volume, wherein the NMP module is associated with a respective allocation unit of the plurality of allocation units, wherein the NMP module is configured to return a state of the respective allocation unit in response to one or more commands received from a plurality of client devices, wherein the state of the respective allocation unit includes a mode of the respective allocation unit, wherein the mode comprises one of active, uninitialized, sealing, sealed, or full;

wherein, when the mode of the respective allocation unit is uninitialized, the NMP module is configured to change the mode of the respective allocation unit to active in response to receiving an append command from a client device of the plurality of client devices, including a state of a previous allocation unit, in which the mode is sealed; and wherein, when the mode of the respective allocation unit is active and the NMP module determines that the respective allocation unit is full, the NMP module is configured to change the mode of the respective allocation unit to sealed, and reject any incoming append commands.

2. The NMP module of claim 1, wherein the changing the mode of the respective allocation unit from uninitialized to active further comprises setting a log offset of the respective allocation unit based on a log offset and a last valid byte of the previous allocation unit included in the state of the previous allocation unit in which the mode is sealed.

3. The NMP module of claim 1, further configured to:
determine that a remaining storage capacity of the respective allocation unit is below a first threshold,
change the mode of the respective allocation unit to sealing and reject any further incoming append commands, and
change the mode of the respective allocation unit to sealed once any pending append actions have been completed.

4. The NMP module of claim 3, further configured to:
determine that the remaining storage capacity of the respective allocation unit is below a second threshold greater than the first threshold,
change the mode of the respective allocation unit to full, and
reject any further incoming append commands associated with a payload which is greater than a predetermined payload size threshold.

5. The NMP module of claim 1, further configured to return the state of the respective allocation unit in response to a getState command received from the plurality of client devices.

6. A client device arranged to communicate with a centralized logging storage array which includes a plurality of servers configured to host a plurality of allocation units assigned to a logical volume, the client device is configured to:
maintain a state map including a state of each respective allocation unit assigned to the logical volume, wherein the state comprises a mode of the respective allocation unit, wherein the mode comprises one of active uninitialized, sealing, or sealed;
send at least one append command to a current allocation unit, the append command including the state of the current allocation unit; and
in response to receiving a response to the append command from a near memory processing (NMP) module associated with the current allocation unit, the response indicating that the mode of the current allocation unit is sealed, resend the append command with the state of the current allocation unit, in which the mode is sealed, to a next allocation unit.

7. The client device of claim 6, wherein the state of each respective allocation unit in the state map further comprises a log offset of the respective allocation unit and a last valid byte of the respective allocation unit.

8. The client device of claim 6, wherein, in response to receiving a response to the append command from the NMP module indicating that the mode of the current allocation unit is sealing, the client device is configured to resend the append command with the state of the current allocation unit, in which the mode is sealing, to the next allocation unit.

9. The client device of claim 8, further configured to send one or more getState commands to the current allocation unit.

10. The client device of claim 6, wherein, in response to receiving a response to the append command from the NMP module indicating that the mode of the current allocation unit is sealing, the client device is configured to determine whether a payload associated with the append command is greater than or less than a predetermined size threshold:

wherein upon determining that the payload is less than the predetermined size threshold, the client device is configured to resend the append command with the state of the current allocation unit, in which the mode is sealing, to the next allocation unit, and upon determining that the payload is greater than the predetermined size threshold, the client device is configured to send a GetState command to the current allocation unit.

11. A method of operating a centralized logging storage array which includes a plurality of servers configured to host a plurality of allocation units assigned to a logical volume, wherein a near memory processing (NMP) module is associated with a respective allocation unit of the plurality of allocation units, the method comprising:

returning, by the NMP module in response to one or more commands received from a plurality of client devices, a state of the respective allocation unit, wherein the state of the respective allocation unit includes a mode of the respective allocation unit, wherein the mode comprises one of active, uninitialized, sealing, sealed, or full;

changing, by the NMP module when the mode of the respective allocation unit is uninitialized, the mode of the respective allocation unit to active in response to receiving an append command from a client device including a state of a previous allocation unit, in which the mode is sealed; and changing, by the NMP module when the mode of the respective allocation unit is active and the NMP module determines that the respective allocation unit is full, the mode of the respective allocation unit to sealed, and rejecting any incoming append commands.

12. The method of claim 11, wherein changing the mode of the respective allocation unit from uninitialized to active further comprises setting a log offset of the respective allocation unit based on a log offset and a last valid byte of the previous allocation unit included in the state of the previous allocation unit in which the mode is sealed.

13. The method of claim 11, further comprising:

determining, by the NMP module, that a remaining storage capacity of the respective allocation unit is below a first threshold, changing, by the NMP module, the mode of the respective allocation unit to sealing and rejecting any further incoming append commands, and changing, by the NMP module, the mode of the respective allocation unit to sealed once any pending append actions have been completed.

14. The method of claim 13, further comprising:

determining, by the NMP module, that a remaining storage capacity of the associated allocation unit is below a second threshold greater than the first threshold, changing, by the NMP module, the mode of the respective allocation unit to full, and rejecting, by the NMP module, any further incoming append commands associated with a payload which is greater than a predetermined payload size threshold.

15. The method of claim 11, further comprising returning, by the NMP module, the state of the respective allocation unit in response to a getState command received from the plurality of client devices.

16. The method of claim 11, further comprising:

maintaining, by a client device arranged to communicate with the centralized logging storage array, a state map including a state of each allocation unit assigned to the logical volume, wherein the state comprises the mode of each allocation unit;

sending, by the client device, at least one append command to a current allocation unit, the append command including the state of the current allocation unit; and resending, by the client device in response to receiving the response to the append command from the NMP module associated with the current allocation unit indicating that the mode of the current allocation unit is sealed, the append command with the state of the current allocation unit, in which the mode is sealed, to a next allocation unit.

17. The method of claim 16, wherein the state of each respective allocation unit in the state map further comprises a log offset of the respective allocation unit and a last valid byte of the respective allocation unit.

18. The method of claim 16, further comprising resending, by the client device in response to receiving a response to the append command from the NMP module indicating that the mode of the current allocation unit is sealing, the append command with the state of the current allocation unit, in which the mode is sealing, to the next allocation unit.

19. The method of claim 18, further comprising sending, by the client device, one or more getState commands to the current allocation unit.

20. The method of claim 16, further comprising:

determining, by the client device in response to receiving a response to the append command from the NMP module indicating that the mode of the current allocation unit is sealing, whether a payload associated with the append command is greater than or less than a predetermined size threshold; and upon determining that the payload is less than the predetermined size threshold, resending, by the client device, the append command with the state of the current allocation unit, in which the mode is sealing, to the next allocation unit, and upon determining that the payload is greater than the predetermined size threshold, sending, by the client device, a GetState command to the current allocation unit.

* * * * *